Figure 1:
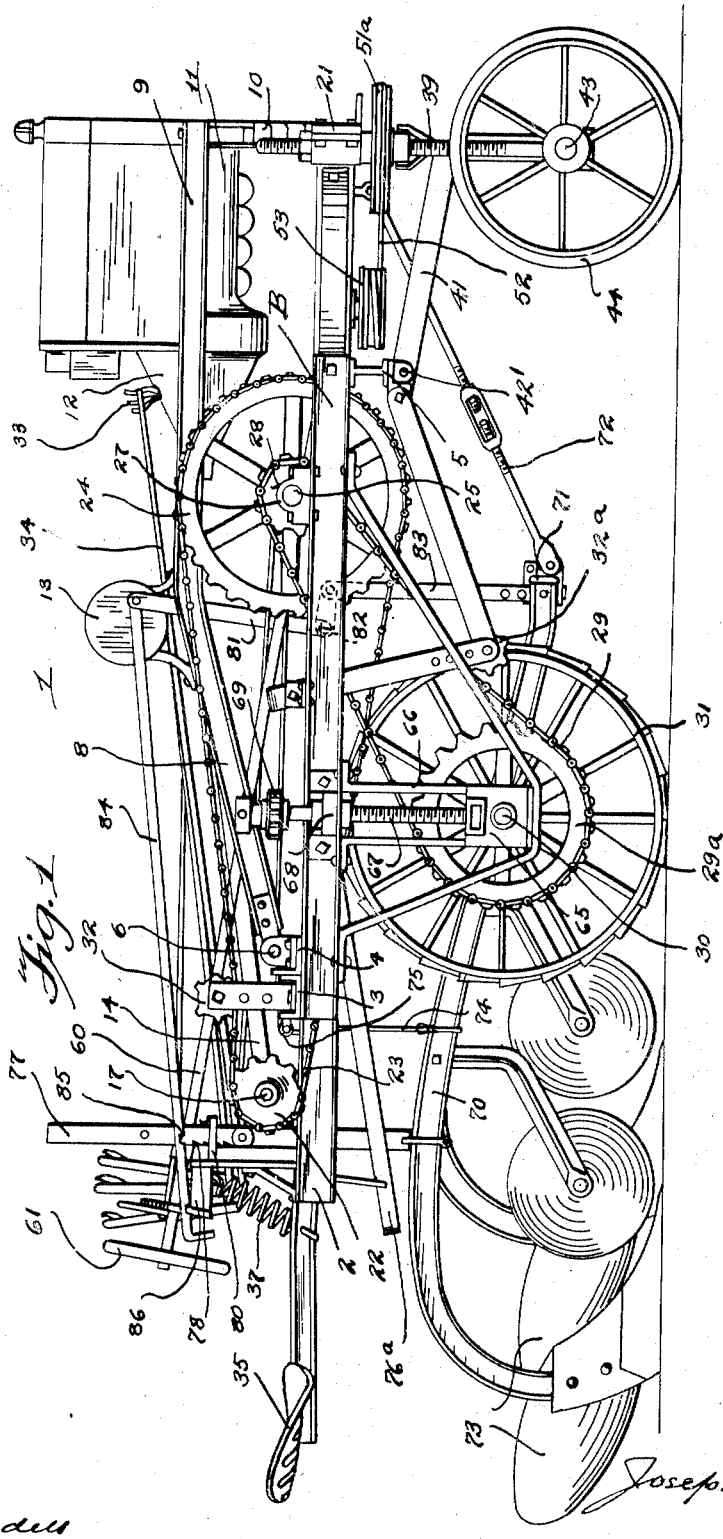

J. W. FREEMAN.
FARM TRACTOR.
APPLICATION FILED MAY 2, 1918.

1,372,068.

Patented Mar. 22, 1921.
4 SHEETS—SHEET 2.

Witness
A. Lundell

Inventor
Joseph W. Freeman
By
C. C. Shepherd
Attorney

J. W. FREEMAN.
FARM TRACTOR.
APPLICATION FILED MAY 2, 1918.

1,372,068.

Patented Mar. 22, 1921.
4 SHEETS—SHEET 3.

Inventor
Joseph W. Freeman

By
C. O. Shepherd
Attorney

Witness
A. Sendell

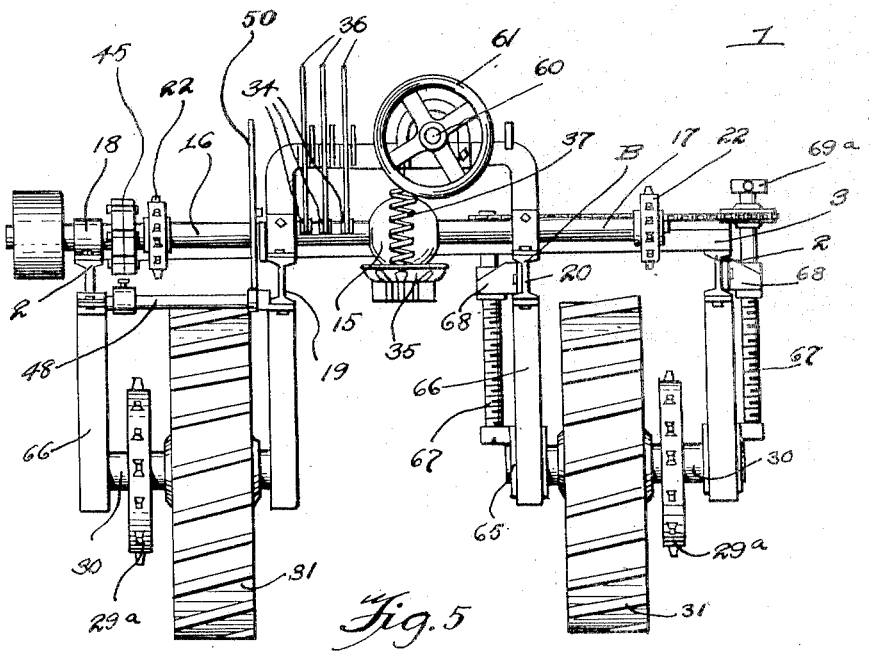

UNITED STATES PATENT OFFICE.

JOSEPH W. FREEMAN, OF COLUMBUS, OHIO.

FARM-TRACTOR.

1,372,068.  Specification of Letters Patent.  Patented Mar. 22, 1921.

Application filed May 2, 1918. Serial No. 231,994.

*To all whom it may concern:*

Be it known that I, JOSEPH W. FREEMAN, a citizen of the United States, residing at Columbus, in the county of Franklin and State of Ohio, have invented certain new and useful Improvements in Farm-Tractors, of which the following is a specification.

This invention relates to farm tractors, and has for its main object to provide a substantial, easily controlled and efficient power driven vehicle for performing draft duties in connection with agricultural pursuits.

Another object of the invention is to improve upon and simplify generally the construction of tractors of the type set forth, and it is also particularly directed to certain improvements upon the construction disclosed in my prior Patent, Number 1,217,293, issued February 27, 1917.

A further object is to provide a tractor on one side with means for vertically adjusting its steering and driving wheels, whereby when the opposite side of the machine is traveling in a ditch or furrow, the main frame thereof may be adjusted to maintain its horizontal working position, thereby equally distributing the weight of the machine upon proper bearings, and to maintain certain of its parts, such as its power units, in requisite normal positions calculated to produce the most efficient services.

A still further object resides in improving the steering mechanism of the tractor, wherein this mechanism will be independent of the power unit, and to be capable of permitting the tractor to turn in a circle of minimum radius, whereby said tractor will be capable of turning in desirable short areas to meet the sharp angular corners usually encountered in field plowing.

A further object resides in providing improved means for associating with the tractor any desirable drawn form of agricultural implement or machine, and to provide mechanism for adjusting said implement or machine to assume active or inactive positions in a convenient mechanical manner, whereby said machine or implement may be readily lifted so as to be easily transported from place to place or may be quickly caused to assume operative or active slot engaging positions; the draft means of a tractor being so located that pull imparted thereto will tend to maintain the front portion of a tractor in close engagement with the ground, whereby the tractor will be prevented from rearing or lifting to such positions that the starting thereof would be rendered difficult.

A still further object resides in novel means for transferring power from the engine to the driving wheels of a tractor, whereby the maximum tractive effort of the engine will be rendered available at the base of the driving wheels, said means being further constructed so as to facilitate the starting or turning of a tractor in relatively short distances.

With these and other objects in view, as will appear as the description proceeds, the invention accordingly consists in the novel features of construction, combination of elements and arrangements of parts hereinafter described and having the scope thereof defined by the appended claim.

Figure 2:
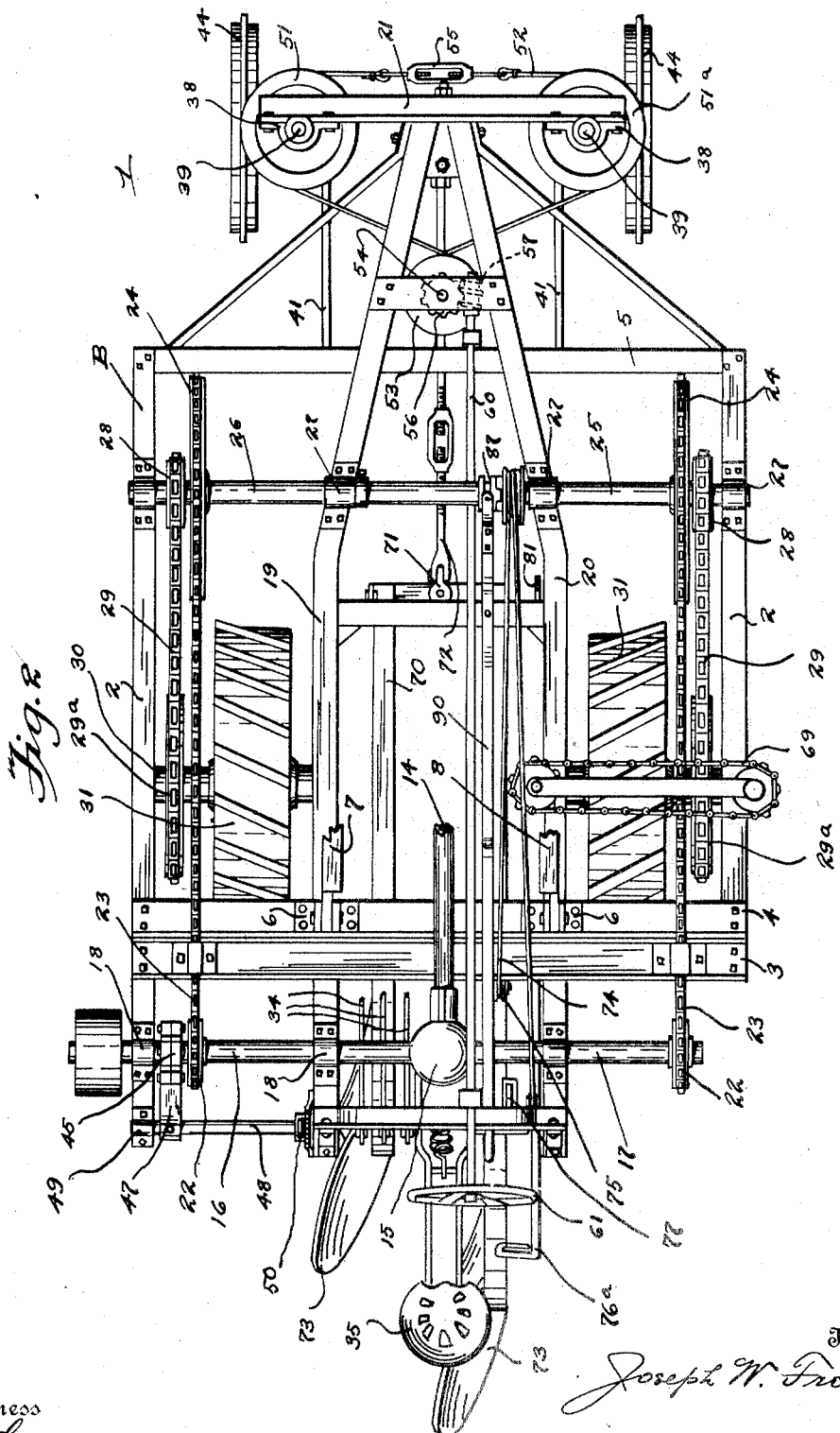
Figure 3:
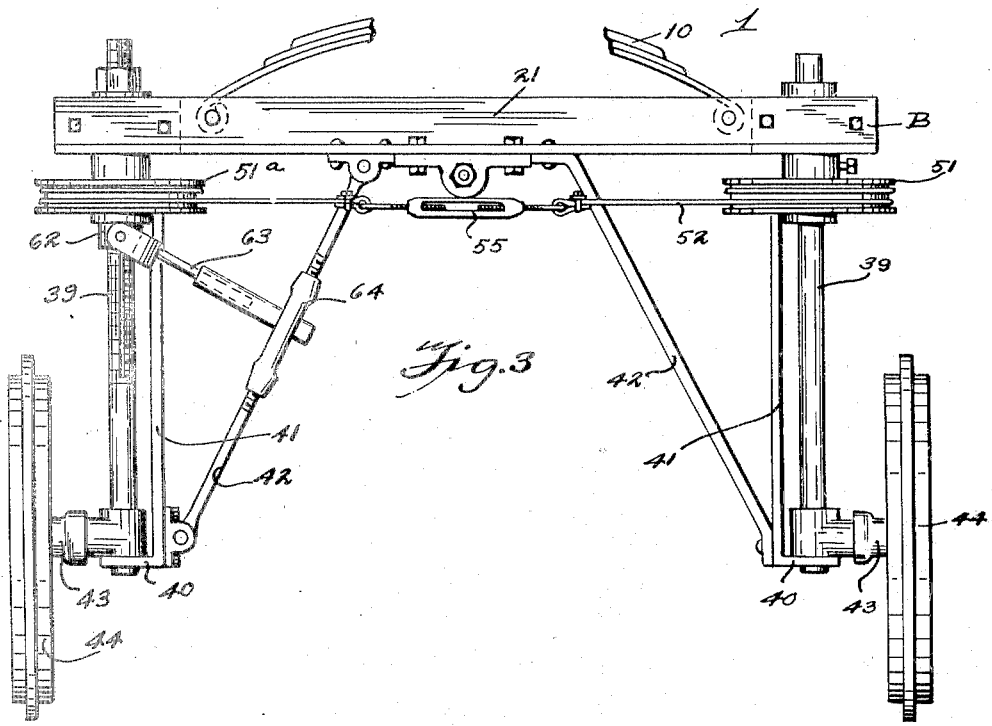
Figure 4:
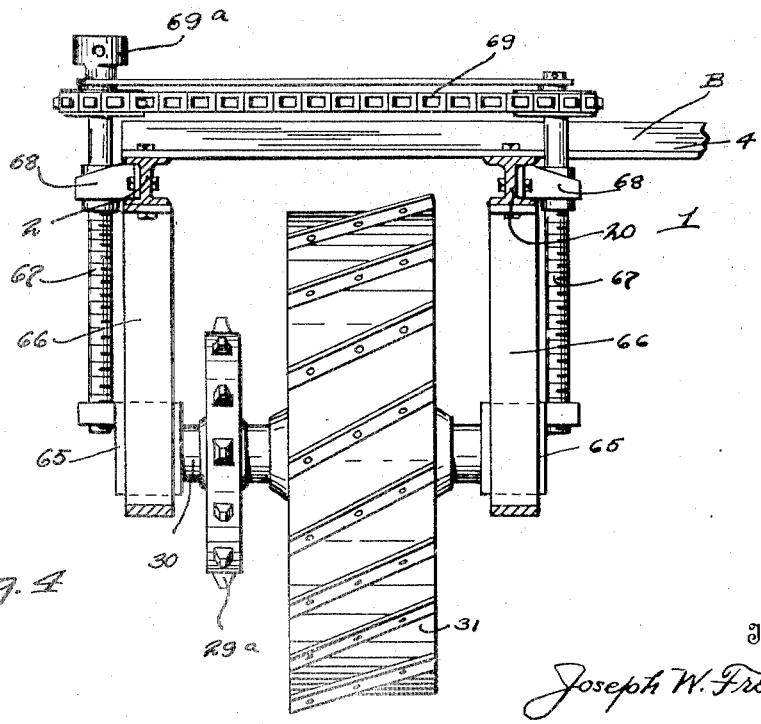

In the drawings, forming a part of this specification and wherein has been shown the preferred form of the invention:

Figure 1 is a side elevation of a farm tractor constructed in accordance with the principles of the invention, Fig. 2 is a top plan view, the engine and its associated frame construction being removed for purposes of clearness, Fig. 3 is a fragmentary front elevation of the tractor, Fig. 4 is a detail view disclosing more particularly the mechanism for raising, lowering and supporting one of the rear driving wheels, Fig. 5 is a rear elevation of the tractor, Fig. 6 is a detail vertical section disclosing the manner of connecting the two alined counter shafts, Fig. 7 is a detail sectional view disclosing the mechanism for locking one of the differential shafts, Fig. 8 is a detail view disclosing the notched part utilized in retaining the plow in an elevated position.

Similar characters of reference denote like parts throughout the several views of the drawings.

Referring more particularly to the details of the invention, and to the manner of constructing and operating its preferred form, the numeral 1 represents my improved tractor in its entirety, and upon reference to Figs. 1 and 2 of the drawing, it will be seen that in this instance the tractor is formed to include a main frame or bed $b$, consisting of side, longitudinally extending channel bars 2 and similar connecting cross bars 3, 4 and 5, which bars form a substantially rectangular frame. Pivotally connected, in this instance, with the bar 4 by means of bearings 6 are the rear inclined ends of frame bars 7 and 8, which latter are arranged in superimposed relation with respect to the frame $b$ and terminate forwardly in straight horizontal portions 9, forming an engine base. These forward ends of the bars 7 and 8 are suitably connected and are mounted upon a bolster spring construction 10, which permits the bars to be resiliently supported and capable of limited rocking movement, whereby the engine 11 carried by the bars will not be directly subject to the jolts and jars instigated by the passage of the tractor over rough and uneven surfaces.

The engine or power plant 11 may be of any desired type or design, and capable of utilizing any desired kind of fuel, said engine being formed to include a multiple speed controlling transmission 12, which may be located in the manner illustrated or in any other suitable position. A fuel tank 13 is carried by the bars 7 and 8 and is connected in the ordinary manner with the intake structure "not shown" of the engine.

Leading from the transmission casing 12 is a drive shaft 14, which extends to a differential mechanism 15 located toward the rear of the tractor, and from which mechanism there laterally projects differential shafts 16 and 17. The shafts are mounted in fixed bearings 18 carried by bars 19 and 20 extending longitudinally and forming a part of the frame $b$, said bars 19 and 20 in this instance being situated between the bars 2. The forward ends of said bars 19 and 20 are angularly bent and extend in converging relation toward the forwardly disposed bolster bar 21 of the tractor, which bar 21 in this instance also serves as a base for the spring construction 10. As will be clearly understood, any suitable means may be employed for bracing and rigidly connecting in a substantial and efficient manner the bar members described so that the latter will be fully capable of withstanding the stresses and strains incident to normal operation. A preferred manner of assembling the bar members has been shown in the drawing, and while this form has proven to be quite satisfactory yet it will be understood that the same is still subject to further change in structure.

The ends of the shafts 16 and 17 preferably carry fixed sprockets 22 over which are trained endless chains 23, the latter being also trained over enlarged sprockets 24 rigidly carried for rotation by alined counter shafts 25 and 26.

These latter shafts are mounted for rotation in fixed bearings 27 carried by the bars 2, 19 and 20 and said counter shafts, contiguous to the sprockets 24, are also provided with other fixed sprockets 28, capable of rotating in unison with the sprockets 24, and chains or their equivalents 29 are trained over the sprockets 28 and also over enlarged sprockets 29ª, rigidly carried by relatively short axle sections 30. The latter sections are suitably mounted in fixed bearings depending from the frame 3 and have rotatably connected therewith the main driving wheels 31 of the tractor.

From the foregoing description it will be apparent that the speed of the engine 11, through the chain and sprocket mechanism disclosed, will be geared down or reduced to obtain its maximum power effort at the base of the wheels 31, and to convert the relatively high speed of operation of said engine into such low speeds as are commonly utilized and are necessary for normal working purposes of the tractor, but it will be appreciated, however, that the gearing described may be changed in proportion and arrangement in accordance with the type and power of the engine employed; for instance, if a slow running, heavy duty type of engine is carried in lieu of the light type of motor shown, which in this instance is of a well known automobile manufacture, certain necessary changes must be made in the form of gearing employed, and hence I do not wish to be limited to the precise construction of gearing set forth. Idler sprockets 32 may be employed for maintaining the chains 23 in close engagement with their respective sprockets, so as to eliminate the effects of slack therein, and likewise similar sprockets 32ª, may be employed for a similar purpose in connection with the chains 29.

Independent of the form of gearing disclosed, the speed of the tractor is further subject to control through the instrumentality of the transmission mechanism 12 which latter in the present instance is provided with control pedals 33, from which extend individual operating rods 34. These rods project longitudinally of the tractor and terminate rearwardly within the adjacent proximity of the operator's seat 35, and said rear extremities are connected in any desired manner with pivoted manually operated levers 36, which are preferably of the toothed segmental type, whereby through the manipulation of said levers the operation of the transmission mechanism may be governed to increase or decrease at will the operating speeds of the tractor, to reverse its movement or to stop its operation altogether, in a manner common to transmission mechanisms of well known construction. The seat 35 is pivotally mounted upon the frame b, and is resiliently supported by means of a spring 37 to enhance the comfort of the operator.

The bolster bar 21 is provided with a plurality of fixed bearings 38, in which are rotatably mounted the upper ends of steering shafts 39. The lower ends of the shafts are journaled within offset lugs 40 integrally formed within bearing arms 41, the latter being securely connected as at 42' with the under side of the cross bar 5. These arms 41 are further braced and supported through the medium of diagonally disposed brace rods 42, which are connected at their upper ends, as shown in Fig. 3, with the bolster bar 21, and at their lower ends with the offset extremities of the arms 41. The lower ends of the shafts 39 carry fixed spindles 43 upon which are rotatably mounted the front or steering wheels 44 of the tractor. It will be observed that owing to the manner described of mounting the steering wheels the latter are capable of considerable turning movement about the shafts 39, so that the tractor will be enabled to negotiate the relatively small turns so frequently encountered and necessary in operating adjacent to fences or like angular obstructions. In fact the tractor may be turned as if it were mounted on a pivot by directly applying the power of the engine 11 to one of the main driving wheels 31, and by rotating the steering wheels 44 to their fullest extent in the direction of turning movement of the tractor, this permits the idle driving wheel to serve as a fulcrum and enables the tractor to turn thereabout.

In order to render one of the wheels 31 inoperative or idle, when the tractor is about to be turned sharply, the differential shaft 16 is provided in the present instance with a fixed disk 45, in the periphery of the latter there is formed a plurality of notches 46 and coöperative with this disk is a pawl 47. The latter is rigidly carried by a shaft 48, journaled in bearings 49, and a manipulating handle 50 being carried by the shaft 48 to effect the rotation of the pawl. Thus it will be manifest that by rocking the shaft 48 in a predetermined direction the up turned end of the pawl 47 will be forced into engagement with one of the notches 46 of the disk 45, thereby effectually locking the shaft 16 against rotation so as to effect the transfer of engine power directly to the other shaft 17. Thus one of the driving wheels to which the shaft 17 is geared is rotated when the driving wheel operated by the shaft 16 remains locked against rotation, thereby when the steering wheels are properly positioned a tractor is capable of effecting abrupt turns. At this juncture it is well to state that it is only necessary to provide one of the shafts 16 and 17 with the locking mechanism set forth, as the reversing mechanism of the transmission 12 may be employed to turn the vehicle in the direction opposite to that described.

To effect the rotation of the shafts 39, the latter are provided with fixed pulleys 51, over which are trained cables 52 the latter being similarly wound about a third wheel or drum 53 carried upon a stud shaft 54, which shaft is journaled in fixed bearings depending from the converging ends of the bars 19 and 20. A turn buckle or the like 55 is adjustably connected with the ends of the cable 52 to eliminate slack in the latter and to render the cable taut or stretched so as to be capable of rotating the wheels, over which it is trained, in unison. The sheave wheel 53 is rotated in this instance by providing the shaft 54 with a gear 56 which gear is situated to mesh with a worm screw 57 carried upon the forward end of a steering shaft 60. The latter is suitably journaled for rotation and has its rear extremity equipped with a manipulating wheel 61 located contiguous to the operator's seat 35, whereby it will be seen that the steering movements of the tractor are under the convenient control of the operator.

In order to preserve the equilibrium of the tractor and to maintain the frame b in its level working position when the tractor is operating under road conditions which tend to maintain one side thereof higher than the other, so as to unequally distribute its stresses and strains, mechanism has been provided for quickly and conveniently adjusting said frame to assume a level working position irrespective of the operating positions of its traction wheels. Such inclination of a tractor, for example, is frequently established when one of its driving wheels is traveling in a furrow and the other on unplowed ground which condition tends to thrust the way of the tractor to one side and causes considerable trouble if operated for any length of time in this position with regard to lubrication. The invention therefore contemplates the provision of mechanism for overcoming the inclination of the frame b and its associated parts, and to cause the same to maintain normal, horizontal positions, hence means have been provided for equally distributing the operating strains and stresses and to further insure proper lubrication of the engine and other similar parts. To this end the steering shaft 39 located to the right of the tractor is provided with screw threads along its upper portions, and threaded upon this upper portion of the steering shaft is a nut 62, upon which the pulley 51$^a$ rests, said pulley being preferably splined or keyed to the shaft 39. This nut 62 is rotated through the medium of a handle 63 and it is therefore capable of being moved up and down upon the threaded portions of a shaft 39, thereby controlling the inclination of that side of the bar 21 which, with the pulley 51ª engages by gravity the upper surface of the nut 62. In order to compensate for the inclination of the bar 21, one of the brace rods 42 lying adjacent the steering shaft is provided with a turn buckle 64, whereby the length of the brace rod upon which it is mounted is capable of being adjusted to conform with the angularity of the bar 21. This turn buckle 64 is also employed to lock the telescopic end of the handle 63, as is clearly shown in Fig. 3 of the drawing, whereby the nut 62 will be locked against undue rotation.

The driving wheel 31 to the right of the tractor and in alinement with the forwardly adjustable steering wheel, has its axle 30 mounted in bearing blocks 65, which blocks are slidably mounted in fixed bearings 66 depending from the frame bars 2 and 20. Connected with the blocks 65 are a plurality of vertically disposed, parallel adjusting screws 67, which have their upper ends threaded into fixed bearings 68 carried by the said frame bars. The extreme upper ends of the screws 67 are equipped with sprockets over which is trained an endless chain 69, through the medium of which the screws are capable of being uniformly rotated. The outer screw 67 is equipped with a wrench receiving head 69ª, to which a suitable tool, not shown, may be applied to effect the rotation of both of the screws 67. From the foregoing it will be manifest that means have been provided whereby the frame $b$ may be quickly adjusted to assume a desired horizontal position, thereby enabling the tractor to operate under normal conditions irrespective of the condition of the surface over which it is traveling. If desired adjustment of the wheels described may be applied to all four wheels instead of the two, without departing from the spirit of the invention, or the adjustment may be operated by power derived from the engine instead of by the manual process set forth.

The tractor described may be employed for drawing different types of agricultural machines or implements, and for purposes of illustration the same has been shown as employed in connection with plows. To effect this the beams 70 of a twin set of plows are provided with the usual clevis 71, to which is connected an extensible draft bar 72, the upper end of said draft bar being suitably connected to the converging ends of the bars 19 and 20, and hence it will be seen that the pull exercised by the plow shares 73 will tend to force the forward end of the tractor into firm engagement with the soil, and in fact the greater the pull the more closely will the tractor adhere to the ground or road bed, as will be clearly understood. To retain the plow in elevated position so as to be capable of being conveniently transported, there is connected by the beams 70 thereof a cable 74, which is trained over a pulley 75 and leads to a drum 76 keyed to the counter shaft 25. The other end of the cable 74 is connected with a pivoted foot lever 76ª, which is arranged adjacent to the driver's seat 35. By depressing the lever 76ª, the cable 74 will be tightly drawn about the pulley or drum 75, so that the rotation of said drum will result in winding the cable 74 thereabout so as to draw the beams 70 upwardly. The beams are retained in this upwardly drawn position by providing the same with a vertically disposed bar 77, on the face of which being provided with ratchet teeth 78, which teeth are pressed by means of the spring 79 into engagement with a heel formed upon a rigidly mounted bracket 80. Hence through the medium of the bar 77 the plow structure will be retained in its elevated position by the engagement of the teeth 78 with the bracket 80 and will thus remain supported until the bar 77 is released from engagement with said bracket, whence the plow structure will fall by gravity into its lower active position. The forward end of the plow structure is also capable of being adjusted through the medium of a bell crank lever 81, which is pivoted as at 82 to the frame $b$. The short arm of this lever 81 is connected by means of a link 83 with the clevis construction 71 of the plow structure, and the long arm of a bell crank is connected with a longitudinally extending link 84 which extends rearwardly and is provided with an operating handle. By reciprocating this link 84 the bell crank lever will be oscillated so as to effect the raising or lowering of the forward end of the plow structure. Notches or an equivalent structure 85 are formed in the rear end of the link 84 and is situated to engage with a rigidly supported bracket 86, whereby the bell crank may be retained in a locked position and the elevated or lowered positions of the forward end of the plow structure may be maintained.

Normally, the counter shafts 25 and 26 are independently rotatable, but in certain instances it is desirable that the shafts should rotate together, as for instance if one of the driving wheels should strike a soft spot in a road bed the same would be liable to slip thus transferring power to one side of the machine, and to overcome this tendency and to equally distribute the power to both of the driving wheels, use is made of the clutch construction 87. This construction in its preferred form consists of a sliding member keyed to the shaft 26, which is capable of engaging with a coöperative clutch base 88 provided upon one side of the drum 75. The movement of the clutch 87 is controlled by means of a pivoted lever 90 which extends rearwardly of the machine and terminates adjacent to the seat 35. By oscillating this lever 90, the clutch construction will be shifted to interlock the counter shafts 25 and 26, so that the synchronous rotation of the latter will be insured as long as one of the differential shafts is in a state of rotation.

From the foregoing description taken in connection with the accompanying drawings it will be seen that there is provided a tractor wherein the objects of the invention have been achieved and that all of the advantageous features of control, adjustment and operation above mentioned, are, among others present. The tractor is relatively simple in construction when its results are taken into consideration and may be conveniently operated by a single driver, as the controllers of the machine are all located in convenient reach of the seat 35. The frame $b$ is of such height and the wheels thereof are so separated that plenty of clearance will be afforded to permit the tractor to operate over growing plants and in between rows of the latter without danger of mutilating or destroying said plants, hence the machine is somewhat higher than many tractors of common construction. While a well known type of automobile engine has been illustrated as furnishing power to the tractor it is obvious that any other form of engine may be substituted in lieu thereof, but the engine shown has been found by actual tests to impart very satisfactory service. It will be further appreciated that a cultivator or the like may be connected with the tractor in place of the plow structure shown and described.

What is claimed is:

In a tractor, a main frame, an engine bed comprising a pair of frame bars, means for pivoting the rear ends of said bars to said frame, a spring structure interposed between said frame and the forward extremities of said bars, an engine mounted upon said bars, a pair of differential shafts, transmission and differential mechanism coöperative of said engine for imparting controlled rotary motion to said differential shafts, a pair of counter shafts supported by said main frame parallel to said differential shafts, a pair of driving wheels, and chain and sprocket mechanism connecting said counter shafts with said driving wheels.

In testimony whereof I affix my signature in presence of two witnesses.

JOSEPH W. FREEMAN.

Witnesses:
JOHN MORRISEY,
E. T. FOX.